United States Patent
Teuke

(10) Patent No.: US 10,089,273 B2
(45) Date of Patent: Oct. 2, 2018

(54) DYNAMIC ADDRESSING

(71) Applicant: ebm-papst Mulfingen GmbH & Co. KG, Mulfingen (DE)

(72) Inventor: Klaus Teuke, Doerzbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 106 days.

(21) Appl. No.: 15/235,135

(22) Filed: Aug. 12, 2016

(65) Prior Publication Data

US 2017/0046292 A1 Feb. 16, 2017

(30) Foreign Application Priority Data

Aug. 14, 2015 (DE) .................. 10 2015 113 491

(51) Int. Cl.
| | |
|---|---|
| *G06F 13/00* | (2006.01) |
| *G06F 13/40* | (2006.01) |
| *H04L 12/403* | (2006.01) |
| *G06F 12/06* | (2006.01) |
| *H04L 12/40* | (2006.01) |
| *G06F 13/42* | (2006.01) |
| *G06F 13/364* | (2006.01) |

(52) U.S. Cl.
CPC ........ *G06F 13/404* (2013.01); *G06F 12/0646* (2013.01); *G06F 13/364* (2013.01); *G06F 13/4282* (2013.01); *H04L 12/403* (2013.01); *H04L 12/40169* (2013.01); *G06F 2213/0052* (2013.01)

(58) Field of Classification Search
None
See application file for complete search history.

(56) References Cited

U.S. PATENT DOCUMENTS

| | | | | |
|---|---|---|---|---|
| 7,882,289 | B2 * | 2/2011 | Furuya ................ | G06F 13/4247 710/106 |
| 8,378,806 | B2 * | 2/2013 | Piccolo, III .......... | G08B 25/003 340/10.32 |
| 2004/0215862 | A1 * | 10/2004 | Cedar ................. | G06F 12/0653 710/301 |
| 2008/0040515 | A1 * | 2/2008 | Schaetzle ........... | G05B 19/0421 710/3 |
| 2008/0301344 | A1 * | 12/2008 | Hsieh .................. | G06F 13/4282 710/110 |
| 2010/0122003 | A1 * | 5/2010 | Hu ........................ | H04B 10/60 710/110 |

(Continued)

*Primary Examiner* — Elias Mamo
(74) *Attorney, Agent, or Firm* — Harness, Dickey & Pierce, P.L.C.

(57) ABSTRACT

This invention relates to a dynamically addressable master-slave system and a method for dynamic addressing of slave units, wherein a master unit and a plurality of slave units are provided and the slave units are connected to the master unit via a bus system and can receive at least one broadcast command from the master unit via the bus line of the bus system, wherein the master-slave system is configured such that the master unit can send respective broadcast commands to the slave units, on the one hand, for activation, and on the other hand, for performing the dynamic addressing process of slave addresses, and wherein the slave units each comprise an address input and an address output and are serially connected via an address line that is separate from the bus line.

9 Claims, 2 Drawing Sheets

(56) References Cited

U.S. PATENT DOCUMENTS

2010/0185784 A1\* 7/2010 De Nie .............. G05B 19/0423
710/9
2012/0221755 A1\* 8/2012 Schultz .............. G05B 19/4185
710/110

\* cited by examiner

DYNAMIC ADDRESSING

CROSS REFERENCE TO RELATED APPLICATIONS

This application claims the benefit and priority of DE 10 2015 113 491.8, filed Aug. 14, 2015. The entire disclosure of the above application is incorporated herein by reference.

FIELD OF THE INVENTION

The invention relates to a dynamically addressable master-slave system and a method for dynamic addressing of slave units.

BACKGROUND OF THE INVENTION

Bus systems of various types have been known for a long time. The master/slave bus systems this invention is based on mostly have the property that all slave must have unique addresses to be addressed individually. Each slave can be addressed individually in this way, wherein settings of the slave can be changed or status information can be queried from the slave. Bus systems of the most varied types, such as master-slave bus systems, have been known for a long time in prior art.

In many master-slave bus systems, the master unit can individually identify and address the slave units of the system. In this way, a master unit is for example capable to operate a system component triggered by a specific slave unit or to assign messages received to a specific slave unit and thus to a specific system component. To provide such functionality, the slave unit on the one hand needs an address that is unique throughout the system; on the other hand, the master unit must know the unique address and the association of the slave unit with a system component or its position in the bus system.

This is conventionally achieved, for example, by performing an addressing or orientation phase during the initialization of a bus system. In this phase, system addresses are assigned to the slave units in a certain order, or the master unit is given the opportunity to query successively stored device identifiers of individual slave units at various positions. For example, addresses are assigned to the slave units manually in that the existing slaves are connected to the bus system individually one after the other or are released for addressing individually one after the other using a manually operated switch. Because only one defined, manually selected slave unit is connected to the bus line or released for addressing, the master unit can assign a unique address to this individual slave unit by outputting a broadcast command on the bus—which is actually directed to all slave units attached to the bus system. Due to the defined order in which the slave units are addressed, the master unit knows the relative position of each slave unit in the system after address allocation. Such manual methods are time consuming and susceptible to errors since they involve a person.

DE 103 36 301 A1 proposes an automated addressing process. A bus-based addressing system of slave units is known from EP 2 287 689 EP. The solutions known from prior art require respective system components for implementing the addressing method and for implementing the bus architecture, all of which causing extra costs and needing installation space. Measures for the subsequent configuration of address allocation are also necessary when replacing a plant component that is connected to a slave, such as a fan.

DE 10 2014 117 797.5 A1 therefore proposes a master-slave system including a master unit having a digital output for providing a signal or a serial signal sequence of signals, and multiple slave units, wherein each of the slave units includes one digital serial memory having a size of one bit, and each slave unit includes an input and an output, wherein the slave units are serially connected to one another via the inputs and the outputs via a signal line, and wherein the input of a first slave unit is connected via the signal line to the digital output of the master unit. The master-slave system is configured such that a signal (signal change) of a serial signal sequence supplied by the digital output is detected at the input of the slave unit, in order to raise the address of the corresponding slave unit in each case by the value "1", to store the signal change in the memory and to output a signal corresponding to the content of the memory at the output of the memory.

It is a disadvantage of this addressing method that addressing via shift registers requires a clock signal from the master and addressing does not run quasi-automatically after the system start.

U.S. Pat. No. 8,856,413 B2 discloses a dynamically addressable slave unit including an interface bus, an enable circuit having a switch and two control ports which are connected via the enable circuit. The system is configured such that address allocation is only possible if the bus interface control signal is present at one of the ports and the signal switch is open to control the release. Otherwise the enable circuit locks the slave unit. The disadvantage of this method is that a special circuit is required to perform the addressing.

There is also a need for performing the addressing in an ascending address order and to eliminate errors automatically during address transfer (that is, without manual intervention).

SUMMARY

Before this background, it is the object of the present invention to overcome the disadvantages mentioned above and to provide an improved method for dynamic addressing of slave units as well as a dynamically addressable master-slave system which can do without a bus architecture for address allocation, is easy to implement and handle, and runs quasi-automatically after the start of the system.

This object is achieved by a dynamically addressable master-slave system and with a method for dynamic addressing of slave units. The inventive idea is to configure the master-slave system such that the master first transfers an identical start value address via a broadcast command to all slave when the addressing of the slave units is initiated. In this way, the master activates addressing for all slaves via the broadcast command.

The slaves are serially interconnected via an addressing line. The addressing line can be used to transmit signals that contain information about the address. The slaves are for this purpose connected to an address input for receiving the address from the preceding slave and an address output for forwarding its address to the next slave.

When a slave has detected a unique signal at its input, it determines the address of the preceding slave from the signal and sets its own address to a value incremented by "1". This own address is transferred to the output of this slave unit and thus to the input of the next slave unit.

According to the invention, the first slave in the serial chain of slaves has its address assigned by the master via a broadcast command and receives no signal at its address input. This means that it does not change its address in the further course of events.

Alternatively, the master can be connected to the addressing input of the first slave and assign its address via this connection.

From this point in time, the respective new address is provided at the outputs of the slaves. Each of the succeeding slaves reacts to the changed value and changes its address again. The dynamic addressing process is continued until the system is brought into a stable address state of all slave units. In this state, all slaves have a different address and can be addressed individually via the bus line.

According to the present invention, addresses are allocated in ascending order. The stable address state can for example be determined by returning the addressing line of the last slave in the series of serially connected slaves to the master where, according to the invention, e.g. a defined period without an address change represents a stable state.

After the first stable state has been reached, the master deactivates addressing via a command to all slaves sent via the bus line.

According to the invention, a dynamically addressable master-slave system including a master unit and a number of n slave units is proposed, wherein the slave units (slaves) are connected to the master unit via a bus system and can receive at least one broadcast command from the master unit via the bus line of the bus system at the beginning of the addressing process. The slave units each comprise an address input and an address output and are serially interconnected to one another via a separate address line, i.e. separated from the bus line, wherein the master-slave system is configured such that the master unit can simultaneously send broadcast commands to the slave units, on the one hand for activation and on the other hand for performing the dynamic addressing process.

In a preferred embodiment of the invention, a first broadcast command is issued to all slave units for activating the dynamic addressing process by assigning an identical start value address via the bus line to them, particularly to the first slave unit. In this state, all slaves have the same start address. It is preferred that the slaves are, for example, fans that are interconnected via a bus line.

Furthermore, the address output of the n−1 slave units is advantageously connected to the address input of the respective serially adjacent next slave unit.

In a preferred embodiment, activation is followed by the dynamic addressing process using the first or using another broadcast command to all slave units, wherein address allocation to the 2nd to nth slave units is no longer performed via the bus line but via the address line while however the first slave unit no longer changes its address.

Advantageously, the first slave unit is therefore not connected to the address line on its input side and receives its address via a broadcast command via the bus line. In an alternative embodiment, this first slave unit can receive its address via an address line from the master.

The slave address of the ith slave unit increases the address value detected at the input by the value "1" as soon as a signal is received via the address line at the address input of the adjacent (i−1)th slave unit. This address value is then passed on at the output of the affected slave unit.

Advantageously, after increasing the slave address of the ith slave unit, a signal at the address output is conducted to the adjacent (i+1)th slave unit, namely to its address input, and the dynamic addressing process is repeated until n−1 address changes starting from the start value were performed at the nth slave unit (unless there was an error signal).

In another preferred embodiment of the invention, the output of the last slave unit in the serial arrangement is connected to the master unit via a return line to indicate the end of dynamic addressing as soon as a stable address state is reached.

Another aspect of the present invention relates to the method for the dynamic addressing of n slave units of a master-slave system as described above, comprising the following steps:

Activation of the dynamic addressing process is performed using a broadcast command to all slave units;

Assigning an identical start value address to all slave units, particularly to the first slave unit, via a bus line;

Performing the addressing process by increasing the current address value of the respective slave address ($A_i$) of the ith slave unit by the value "1" compared to the input address value as soon as a signal is received at the address input of the adjacent (i−1)th slave unit (2);

After increasing the slave address of the ith slave unit, a signal at the address output is conducted to the address input of the adjacent (i+1)th slave unit, and the dynamic addressing process is repeated until n−1 address changes starting from the start value were performed at the nth slave unit. It is particularly advantageous for performing the method if the signal in the addressing process is forwarded via the address line from the one to the next slave unit using analog signals, bit-coded digital signals, signal pulse sequences, or optical signals.

Other advantageous further developments of the invention are characterized in the dependent claims or are explained in more detail below with reference to the figures and together with a preferred embodiment of the invention.

DRAWINGS

DESCRIPTION

The invention is described below with reference to an exemplary embodiment and to FIGS. 1 to 3, wherein the same reference symbols indicate same functional and/or structural features.

Figure 1:
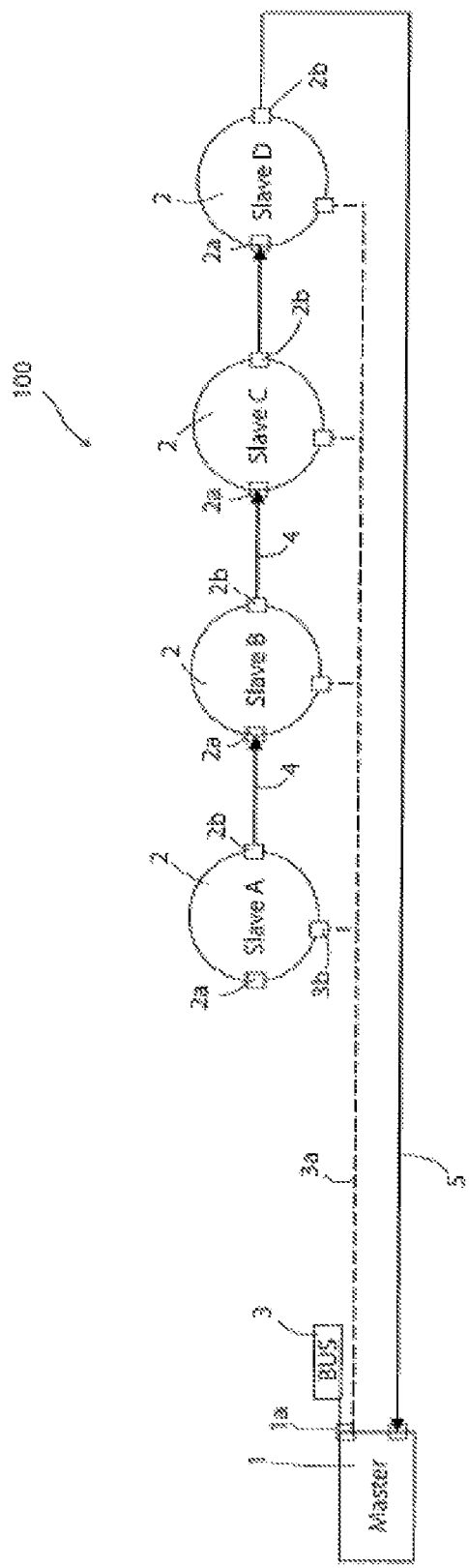
FIG. 1 is a schematic representation of an exemplary embodiment of a master-slave system.
Figure 2:
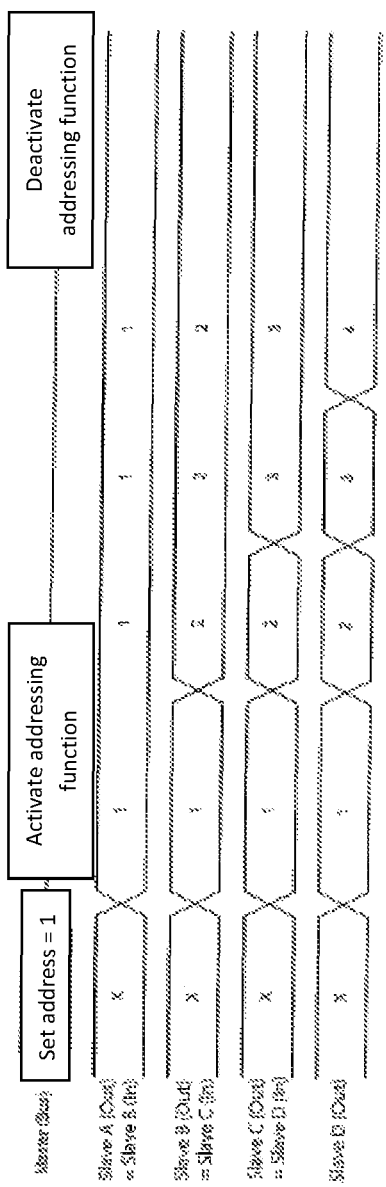
FIG. 2 is a schematic representation of the address allocation process with four slave units.

FIG. 1 is a schematic representation of an exemplary embodiment of a master-slave system 100. The master-slave system 100 includes a master unit 1 and four exemplary fans called Slave A, Slave B, Slave C, and Slave D. In principle, any suitable number of slave units 2 can be provided, wherein said slave units 2 are connected to the master unit 1 and to one another via a bus system 3 and can communicate via the bus line 3*a* of the bus system 3 as soon as they have a unique address.

Each slave unit 2 includes for this purpose a bus interface 3*b* which is connected to the bus interface 1*a* of the master unit 1.

Furthermore, each slave unit 2 comprises an address input 2*a* and an address output 2*b*. The slave units 2 are connected in series with their address output or address input, respectively, to the respective adjacent slave unit 2 via an address data line 4 (in short: address line 4).

As can be seen in FIG. 1, the address line 4 is a line that is separate from the bus line 3a. The first slave unit 2 (Slave A), however, is not connected to the master unit 1 via the address line 4 but via the bus line 3a.

The master-slave system 100 is configured in such a manner that the master unit 1 can send broadcast commands to the slave units 2, on the one hand for activation and on the other hand for performing the dynamic addressing process of slave addresses $A_1, \ldots, A_i, \ldots, A_n$. As can be seen in FIG. 2, a broadcast command "Set address=1" is first sent to all slave units 2. Before that, the address of the slave units 2 can assume any value, which is indicated by an "X" in FIGS. 2 and 3.

Another broadcast command "Activate addressing function" activates the address allocation, which runs quasi-automatically thereafter.

In the example of the four slave units 2, all four slave units 2 have the address value "1" after the broadcast command "Set address=1". However, after detecting an address signal with the address value "1" at the input of the second slave unit 2 (Slave B), the address automatically increases by the value "+1", such that the second slave unit 2 then has the address value "2".

The dynamic process continues likewise to the last slave unit. As can be seen from FIG. 2, this then has the value 4. In a normal case (without interfering signals), the slave unit at the nth position therefore changes its address value n times (including the start addressing).

Figure 3:
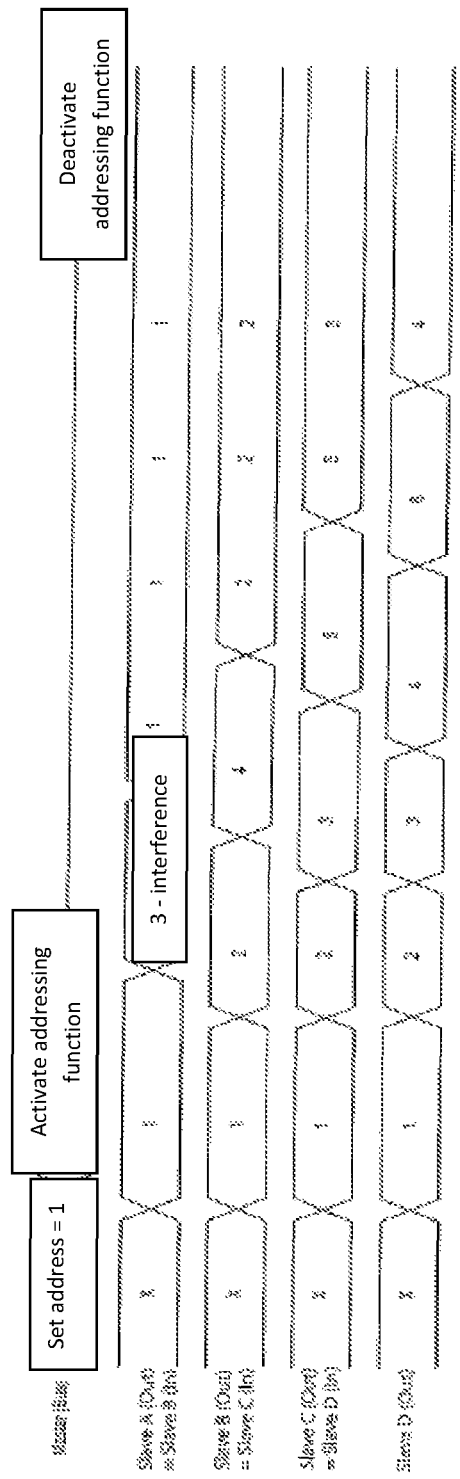
FIG. 3 is a schematic representation of the address allocation similar to FIG. 2, but with an interfering signal.

FIG. 3 shows an example in which an interfering signal having the address value "3" is present at the output of Slave A and the input of Slave B. However, this interfering influence is automatically cleared up in the automatic addressing process according to the invention. The interfering signal is passed on with a time delay to all slave units 2. The interference is therefore only present at each slave for the length of the injected interfering signal. After that, the influence of the interference is eliminated.

The output 2b of the last slave unit 2 is connected via an address line 5 to the master unit 1 to detect the completion of the addressing process. As soon as a stable address state exists, the master unit 1 sends another broadcast command "Deactivate addressing function" via the bus line 3a of the bus system 3. After that, the slave units 2 have a fixed accessible address that can be addressed via the bus system.

The implementation of the invention is not limited to the preferred embodiments described above. Instead, a plurality of variants is conceivable in which the solution described is used for completely different designs. All disclosed features can be used in any combination where technically feasible.

The invention claimed is:

1. A method for dynamic addressing of n slave units of a master-slave systems including a master unit and a number of n slave units, wherein the slave units are connected to the master unit via a bus system and can receive at least one broadcast command from the master unit via the bus line of the bus system, wherein the master-slave system is configured such that the master unit can send respective broadcast commands to the slave units, on the one hand, for activation, and on the other hand, for performing the dynamic addressing process of slave addresses, and wherein the slave units each comprise an address input and an address output and are serially connected via an address line separate from the bus line, the method comprising the following steps:
activating of the dynamic addressing process is performed using a first broadcast command to all slave units;
assigning an identical start valve address to all slave units via a bus line;
performing the addressing process by increasing the input-side address value of a respective slave address of the ith slave unit by the value "1" as soon as a signal is received at the address input of the adjacent slave unit;
after increasing the respective slave address of the ith slave unit, a signal at the address output is conducted to the address input of the adjacent slave unit, and the dynamic addressing process is repeated until the last address change was performed at the nth slave unit;
transmitting a signal from the nth slave unit to the master unit at its output via a return line after its nth addressing, as a result the master unit detects the completion of the addressing method.

2. The method according to claim 1, wherein the signal in the addressing process is forwarded via the address line from the one to the next slave unit using analog signals, bit-coded digital signals, signal pulse sequences, or optical signals.

3. The method according to claim 1, wherein n slave units are provided, wherein the address output of the n−1 slave units is connected to the address input of the respective serially adjacent slave unit.

4. The method according to claim 1, wherein activation is followed by the dynamic addressing process using the first or using another broadcast command to all slave units, wherein address allocation to the 2nd to nth slave units is performed via the address line.

5. The method according to claim 1, wherein as soon as the slave address of the ith slave unit receives a signal at the address input from the adjacent (i−1)th slave unit and adjusts its current address value accordingly, the address value at the address input is increased by the value "1", respectively.

6. The method according to claim 1, wherein after increasing the slave address ($A_i$) of the ith slave unit, a signal at the address output is conducted to the address input of the adjacent (i+1)th slave unit, and the dynamic addressing process is repeated until n−1 address changes starting from the start value were performed at the nth slave unit.

7. The method according to claim 1, wherein the first slave unit is not connected to the address line but gets its address via a broadcast command via the bus line.

8. The method according to claim 1, wherein the first slave unit is connected via an address line to the master unit to get its address via the address line from the master unit.

9. The method according to claim 1, wherein the output of the last slave unit in the serial arrangement is connected to the master unit via a return line.

* * * * *